(12) United States Patent
Schueler et al.

(10) Patent No.: US 8,693,147 B2
(45) Date of Patent: Apr. 8, 2014

(54) ELECTRICAL COMPONENT AND METHOD FOR CONTROLLING AN ELECTRICAL COMPONENT

(75) Inventors: Harald Schueler, Backnang (DE); Sven Hartmann, Stuttgart (DE); Stefan Tumback, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/521,781

(22) PCT Filed: Jan. 13, 2011

(86) PCT No.: PCT/EP2011/050367
§ 371 (c)(1),
(2), (4) Date: Nov. 9, 2012

(87) PCT Pub. No.: WO2011/086113
PCT Pub. Date: Jul. 21, 2011

(65) Prior Publication Data
US 2013/0070375 A1    Mar. 21, 2013

(30) Foreign Application Priority Data

Jan. 14, 2010 (DE) .......................... 10 2010 000 883
Jan. 14, 2010 (DE) .......................... 10 2010 000 887
May 21, 2010 (DE) .......................... 10 2010 029 228

(51) Int. Cl.
*H02H 7/00* (2006.01)
*H02H 9/00* (2006.01)
*H02H 9/08* (2006.01)

(52) U.S. Cl.
USPC ............................. 361/19; 361/143

(58) Field of Classification Search
USPC .......................................................... 361/19
See application file for complete search history.

(56) References Cited

U.S. PATENT DOCUMENTS

| | | | |
|---|---|---|---|
| 3,441,810 A | | 4/1969 | Traina |
| 4,818,884 A | * | 4/1989 | Saubolle ....................... 250/388 |
| 5,909,352 A | | 6/1999 | Klabunde et al. |
| 6,337,602 B2 | * | 1/2002 | Hilliard et al. .................. 331/65 |
| 6,803,859 B2 | * | 10/2004 | Hilliard et al. ................ 340/941 |
| 7,345,858 B2 | * | 3/2008 | Lee et al. ......................... 361/19 |
| 7,679,867 B2 | * | 3/2010 | Choi et al. ....................... 361/19 |
| 7,778,002 B2 | * | 8/2010 | Skinner et al. ................ 361/111 |

FOREIGN PATENT DOCUMENTS

| | | |
|---|---|---|
| JP | 3-284167 | 12/1991 |
| JP | 10-256957 | 9/1998 |

OTHER PUBLICATIONS

International Search Report, PCT International Application No. PCT/EP2011/050367, dated Apr. 13, 2011.

* cited by examiner

*Primary Examiner* — Dharti Patel
(74) *Attorney, Agent, or Firm* — Kenyon & Kenyon LLP

(57) ABSTRACT

An electrical component having a core and a first and second coil positioned around the core is controlled in such a manner, that in response to the second coil being switched off, the first coil is short-circuited via a quenching circuit to quench the inductive load of the second coil.

13 Claims, 12 Drawing Sheets

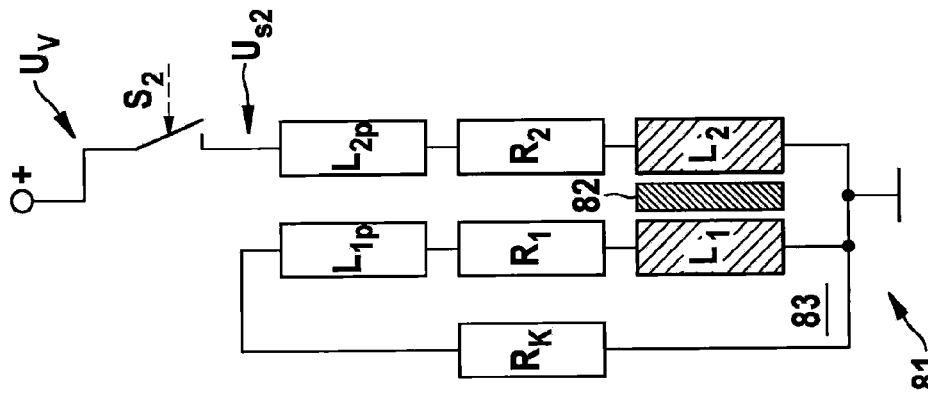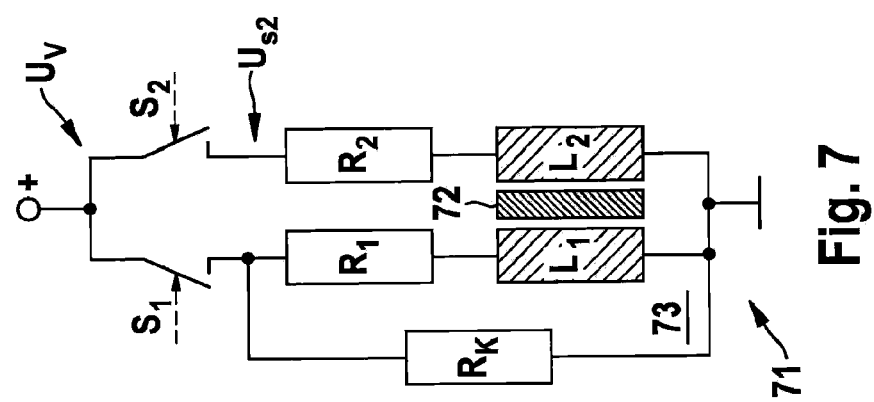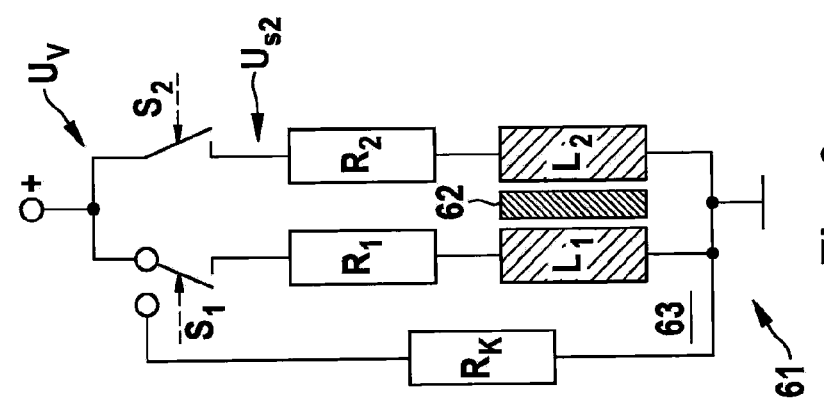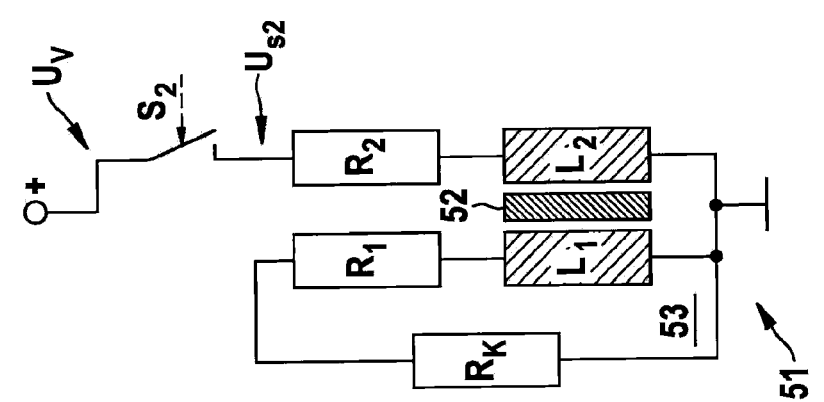

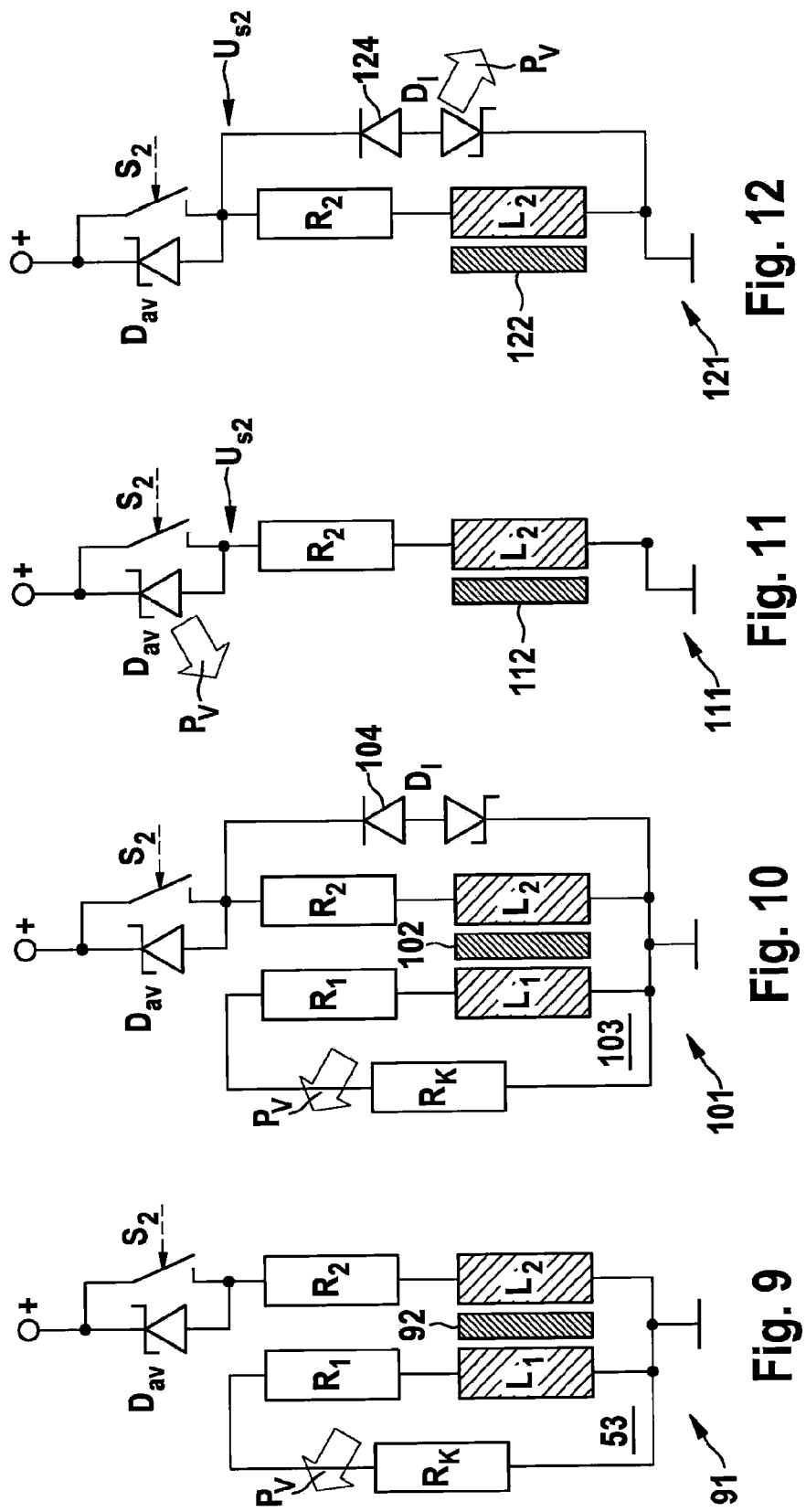

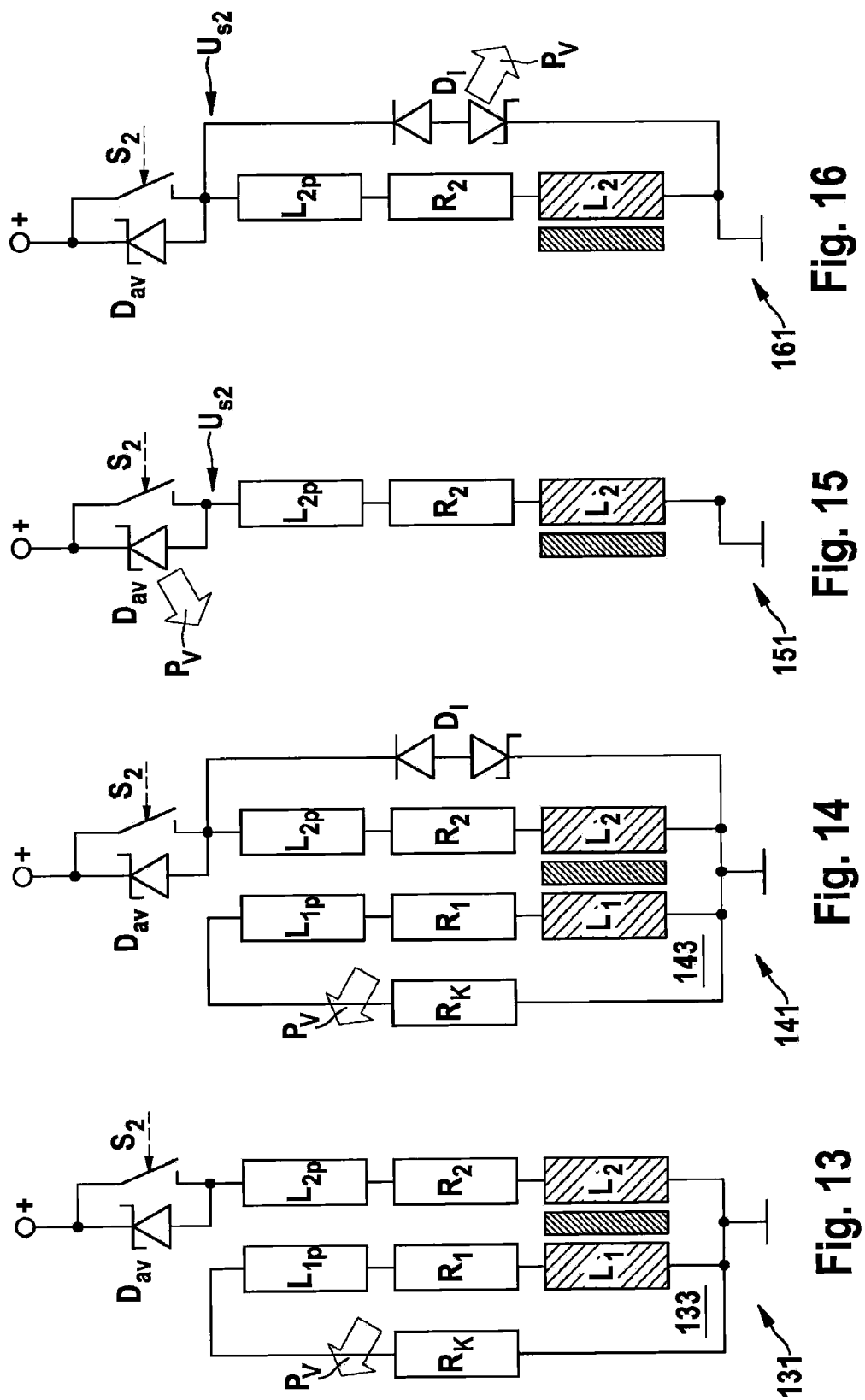

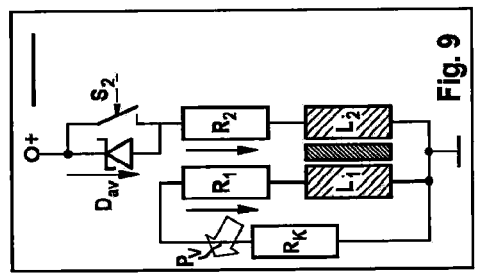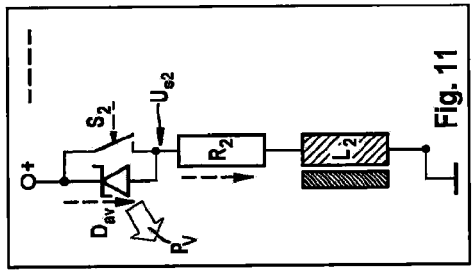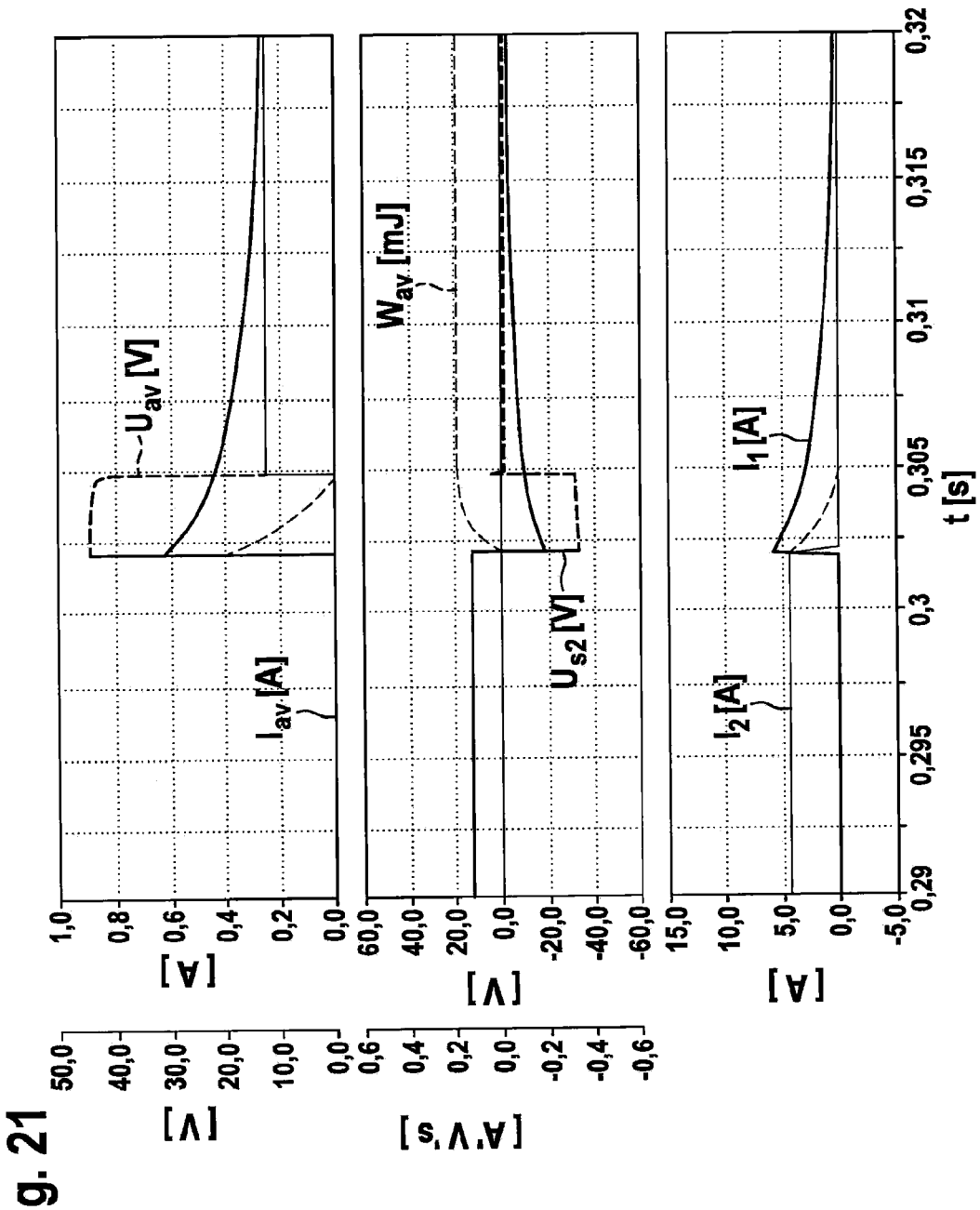
Fig. 21

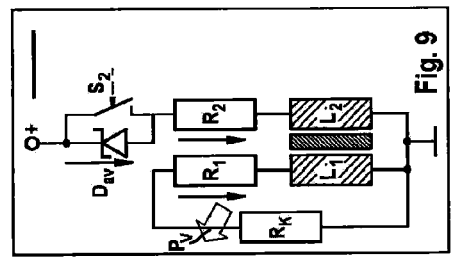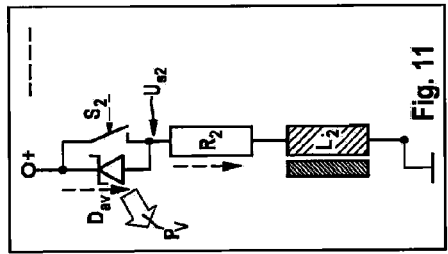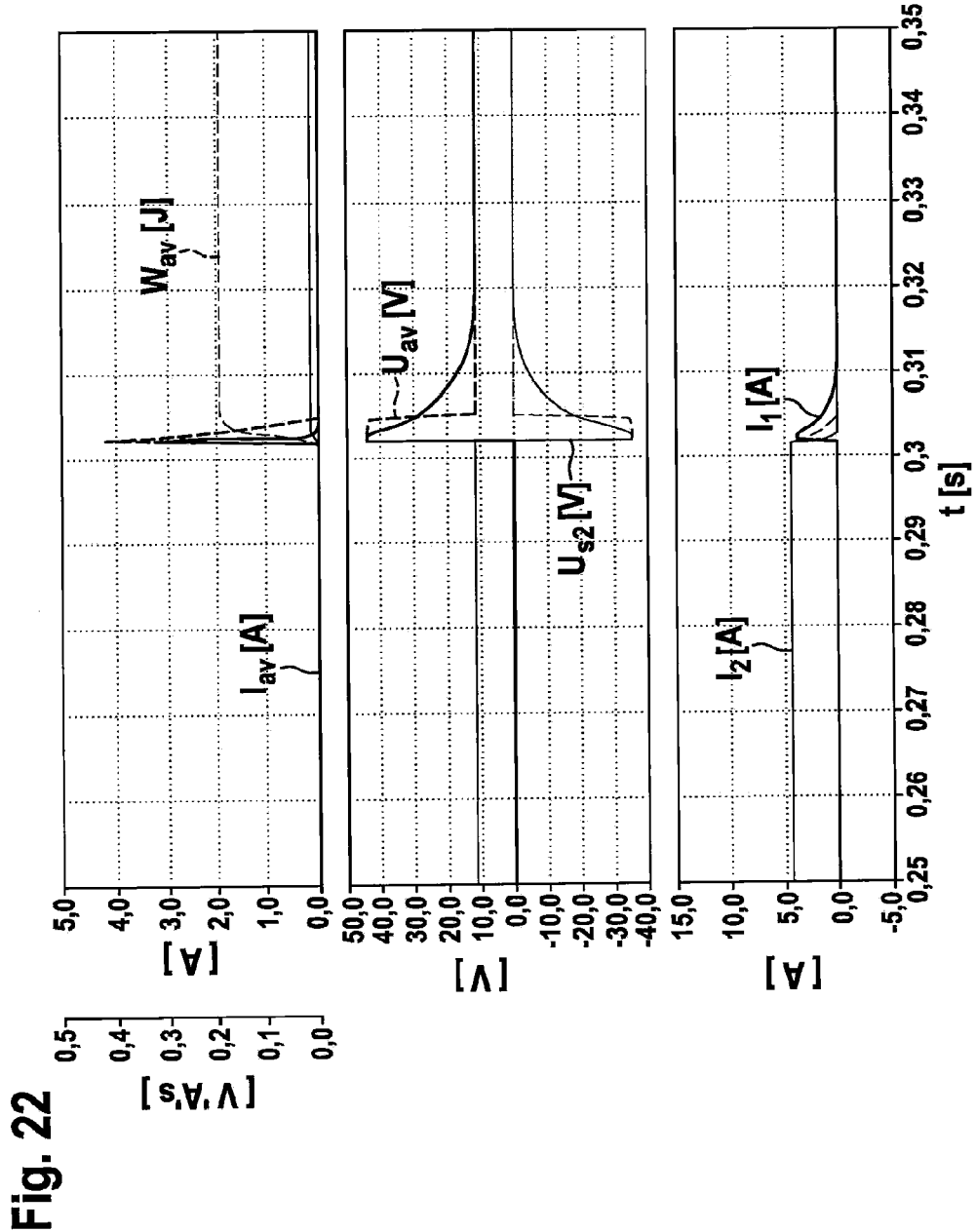
Fig. 22

ELECTRICAL COMPONENT AND METHOD FOR CONTROLLING AN ELECTRICAL COMPONENT

FIELD OF THE INVENTION

The present invention relates to the area of electronic components having inductive loads, such as electromagnets, relays or transformers.

BACKGROUND INFORMATION

Such electrical components have windings that are situated on cores. An example of a very high inductive load is the switching and engaging relay of a starter of an internal combustion engine of a motor vehicle.

In that regard, FIG. 1 shows a schematic view of a first exemplary embodiment of a conventional electrical component 11. Component 11 has a coil $L_2$, $R_2$, which is positioned around a core 12. Presently, for reasons of clarity and of congruence of the figures with the subsequent equations, many of the components shown in the figures are referred to by their characteristic values. For example, coil $L_2$, $R_2$ is referred to by its inductance $L_2$ and its resistance $R_2$.

In addition, electrical component 11 has a switch $S_2$ for connecting coil $L_2$, $R_2$. Upon switching off coil $L_2$, $R_2$ with the aid of switch $S_2$, a switch voltage $U_{S2}$ at switch $S_2$ decreases. If, as in FIG. 1, no measures are taken to quench the inductive load of coil $L_2$, $R_2$ during the switching-off, then, in response to the switching-off, potential $U_{S2}$ decreases to the point where either an electric arc or an avalanche breakdown occurs there.

As a circuit diagram equivalent to this, FIG. 2 shows a schematic view of a second example of the electrical component 21. As in FIG. 1, electrical component 21 has a coil $L_2$, $R_2$ around core 22, as well as a switch $S_2$. In FIG. 2, a Zener diode $D_{av}$ is drawn to illustrate the effect of the arc or the avalanche breakdown explained with reference to FIG. 1. In addition, reference character $P_V$ in FIG. 2 shows the disruptive discharge power in response to switching off switch $S_2$. The effect of the breakdown is normally very harmful to switching component 21 and may result in its destruction. Protective circuits are provided for this reason.

To this end, FIG. 3 shows a schematic view of a third example of a conventional electrical component 31. Electrical component 31 is constructed like electrical components 11 and 21 of FIGS. 1 and 2 and has, accordingly, a coil $L_2$, $R_2$ around a core 32, as well as a switch $S_2$. In this context, electrical component 31 also has the Zener diode $D_{av}$ described using FIG. 2. One form of a protective circuit is the free-wheeling diode 33 illustrated in FIG. 3. To increase the quenching voltage, this free-wheeling diode 33 is also connected in series to a Zener diode $D_{loesch}$. The higher the Zener voltage, the more rapidly the energy of the inductive load may be removed. However, the sum of the decrease in the diode voltage and the Zener voltage must be less than the breakdown voltage of switch $S_2$, or else the destruction of component 31 is likely.

In addition, in the case of high amounts of energy and a short switching-off time, components such as relays, electromagnets or transformers have to be able to withstand very high power losses. This becomes especially critical when frequent switching operations occur. An example of frequently occurring switching operations is clocked or regulated activation of the electrical component.

Such regulated or current-regulated activation with the aid of two-step control or pulse-width modulation is used, for example, when a high drawing-in current, e.g., upon drawing in a magnet, or a high starting current, should initially flow, which should later be decreased, e.g., for holding a magnet. In the case of switching-on, a switch is completely switched through, whereas in the case of holding, alternating switching operations take place. A further, conventional option for performing such an action is division into a closing coil and a hold-in coil. To that end, FIG. 4 shows a schematic view of a fourth exemplary embodiment of a conventional electrical component 41. In this context, electrical component 41 has two coils $L_1$, $R_1$ and $L_2$, $R_2$, which are wound on a common core 42. A first switch $S_1$ is provided for connecting first coil $L_1$, $R_1$. Analogously, a second switch $S_2$ is provided for connecting second coil $L_2$, $R_2$. The voltages at switches $S_1$ and $S_2$ that decrease during the switching operation are referred to as $U_{S1}$ and $U_{S2}$. For example, first coil $L_1$, $R_1$ may be configured as a hold-in coil. Second coil $L_2$, $R_2$ may then be configured as a closing coil. In this context, closing coil $L_2$, $R_2$ is designed in such a manner, that the required, rapid drawing-in is implemented at currents of closing coil $L_2$, $R_2$ that are typically relatively high. Subsequently, a switchover may be made to hold-in coil $L_1$, $R_2$, which has a markedly lower power requirement ($R_1 \gg R_2$). A component such as in FIG. 4 is known, for example, from conventional starter relays.

In addition, capacitors are used as rapid quenching elements or storage elements. Therefore, on one hand, the energy may be removed rapidly from the magnetic circuit, and on the other hand, energy for boosting may be made available for a short response time during closing.

Since, in certain cases, inductive loads may store very high amounts of energy, e.g., up into the range of 1 Joule for starter relays, the degree of complexity and the cost of protective circuits may become relatively high.

SUMMARY

The present invention is based on the recognition that the inductive load of an operating coil occurring while switching off may be quenched simply and cost-effectively by a quenching circuit having an additional coil. In this context, the additional coil or quenching coil is situated or wound on the same core as the operating coil, in particular, a ferromagnetic core.

The time of switching off the operating coil triggers the closing of the quenching circuit and, consequently, the activation of the quenching coil for quenching the inductive load of the operating coil.

Accordingly, an example electronic component is provided which has a core, a first coil and a second coil. In this context, both the first coil and the second coil are positioned, in particular, wound, around the core. The second coil may be switched on and off with the aid of a switch. When the second coil is switched off with the aid of the switch, the first coil is short-circuited via a quenching circuit to quench the inductive load of the second coil. Consequently, the first coil acts as a quenching coil for the second coil that is preferably configured as an operating coil of the electrical component.

In addition, an example starter or starter system for a motor vehicle is provided, the starter or starter system having an electrical component as explained above. The starter system may further include a starter motor.

Furthermore, an example method for controlling an electrical component having a core, a first coil positioned around the core, a second coil positioned around the core, and a switch for switching the second coil on and off, is provided, the method including the step of short-circuiting the first coil via a quenching circuit for quenching the inductive load of the second coil in response to the switching-off of the second coil.

According to one preferred further refinement, the second coil is configured as an operating coil of the electrical component. The first coil is configured as a quenching coil for quenching the inductive load of the operating coil. Consequently, the first coil may quench the inductive load of the operating coil (second coil) in a simple and cost-effective manner. Therefore, a further protective circuit to be particularly provided for the component is advantageously not necessary.

According to a further preferred refinement, the quenching circuit is configured as a shorted circuit made up of a series circuit of the first coil and a closing resistor. The first coil has a particular number of windings, a particular inductance, and a particular resistance. The formation of the quenching circuit as a shorted circuit is a very simple circuit-engineering solution for quenching the inductive load of the second coil.

According to a further preferred refinement, the first coil is situated on the common core of the electrical component, in the form of a reactive coil formed separately from the second coil. Consequently, this further refinement of the quenching circuit according to the present invention requires only two additional elements, namely, the quenching coil and the closing resistor.

According to a further preferred refinement, the quenching circuit is configured as a parallel circuit of the first coil and a closing resistor between a further switch for switching the first coil, and ground.

The use of the further switch may advantageously allow the first coil to also be operated as an operating coil. In this context, the first coil is preferably suited for functioning as an operating coil in a closing operation by this further switch.

This further switch is preferably set up to switch in the first coil in response to the switching-off of the second coil by the switch for the second coil.

In the following, the method of functioning of the electrical component of the present invention is explained in detail. In accordance with this explanation and the present patent application, $R_1$ indicates the resistance of the first coil, $L_1$ indicates the inductance of the first coil, $n_1$ indicates the number of windings of the first coil, $R_2$ indicates the resistance of the second coil, $n_2$ indicates the number of windings of the second coil, $L_2$ indicates the inductance of the second coil, $R_K$ indicates the closing resistance of the quenching circuit, $U_v$ indicates the supply voltage of the electrical component, $U_{av}$ indicates the breakdown voltage of switch $S_2$ of the second coil, and $I_2$ indicates the current flowing through resistor $R_2$ of the second coil $L_2$, $R_2$.

In this context, the ratio of resistances $R_1$, $R_2$ to numbers of windings $n_1$, $n_2$ of the first and second coils is preferably set as a function of the supply voltage $V_v$ and breakdown voltage $U_{av}$ of switch $S_2$ of the second coil, so that breakdown voltage $U_{av}$ is less than a differential voltage between supply voltage $V_v$ and the switch voltage $U_{S2}$ decreasing at switch $S_2$ during the switching operation. The flux $\Phi$ in the core remains constant in the short period of time of the switching-off. Accordingly, $I_1=0$ and $I_2 \neq 0$ prior to the switching-off:

$$\Phi = I_2' * n_2 \tag{1}$$

After switching off switch $S_2$, $I_2=0$, and therefore:

$$I_2' = I_2 * n_2/n_1 \tag{2}$$

In the quenching circuit made up of $L_1$, $R_1+R_K$, current $I_1$ subsequently decreases with the decaying time constant $\tau = L_1/(R_K+R_1)$:

$$I_1(t) = I_1' * \exp(-t/\tau) \tag{3}$$

The current drain is greatest immediately after the switching-off:

$$L_1 * dI_1/dt = -(R_K+R_1) * I_1' \tag{4}$$

In order that all of the energy in the quenching circuit is discharged, the differential voltage between $U_v$ and $U_{S2}$ may not exceed the value of breakdown voltage $U_{av}$ (arc voltage or avalanche voltage of switch $S_2$):

$$U_v - U_{S2} < U_{av}, \text{ where } U_{S2} = d\Phi/dt \sim L_1 * dI_1/dt \tag{5}$$

Immediately after the switching-off, equations (4) and (3) yield the following quenching condition:

$$(R_K+R_1) * n_2/n_1 > (U_{av}-U_v)/I_2$$

$$\text{or } (R_K+R_1)/R_2 * n_2/n_1 > (U_{av}-U_v)/U_v$$

in view of $I_{2,max} = U_v/R_2$

According to a further preferred refinement, the electrical component takes the form of an electromagnet, a relay or a transformer. Examples of a relay include the switching relay or engaging relay of a starter of a motor vehicle.

According to a further preferred refinement, the specific switch takes the form of a field effect transistor (FET).

BRIEF DESCRIPTION OF THE DRAWINGS

Further exemplary embodiments of the present invention are illustrated in the figures and explained in greater detail below.

FIG. 5 shows a schematic view of a first exemplary embodiment of the component according to the present invention.

FIG. 6 shows a schematic view of a second exemplary embodiment of the electrical component according to the present invention.

FIG. 7 shows a schematic view of a third exemplary embodiment of the electrical component according to the present invention.

FIG. 8 shows a schematic view of a fourth exemplary embodiment of the electrical component according to the present invention.

FIG. 9 shows a schematic circuit diagram equivalent to the electrical component of the present invention shown in FIG. 5.

FIG. 10 shows a schematic circuit diagram equivalent to the electrical component of the present invention shown in FIG. 6.

FIGS. 11, 12 show schematic circuit diagrams equivalent to conventional electrical components.

FIGS. 13-16 show schematic circuit diagrams equivalent to FIGS. 9-12, having inductors additionally drawn in.

FIG. 21 shows a simulation example of the disruptive discharge power at a greater supply voltage for comparing the equivalent circuit diagrams of the component of FIG. 10 according to the present invention, to that of the conventional component of FIG. 12.

FIG. 22 shows a simulation example of the quenching limit at a greater supply voltage for comparing the equivalent circuit diagrams of the component of FIG. 10 according to the present invention, to that of the conventional component of FIG. 12.

DETAILED DESCRIPTION OF EXAMPLE EMBODIMENTS

Figure 4:
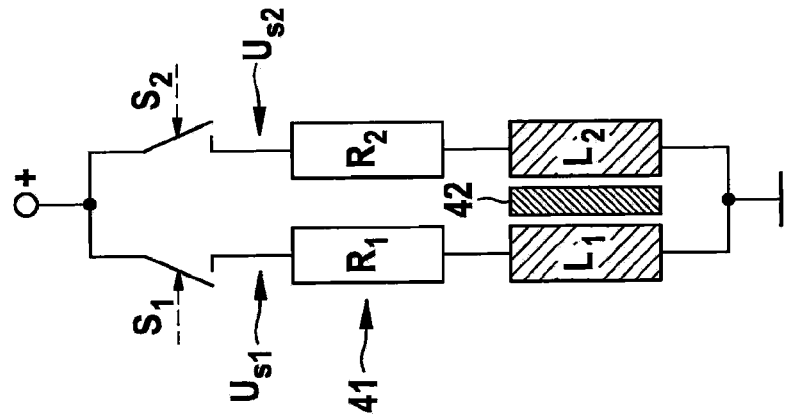
FIG. 4 shows a schematic view of a fourth example of a conventional electrical component.
Figure 3:
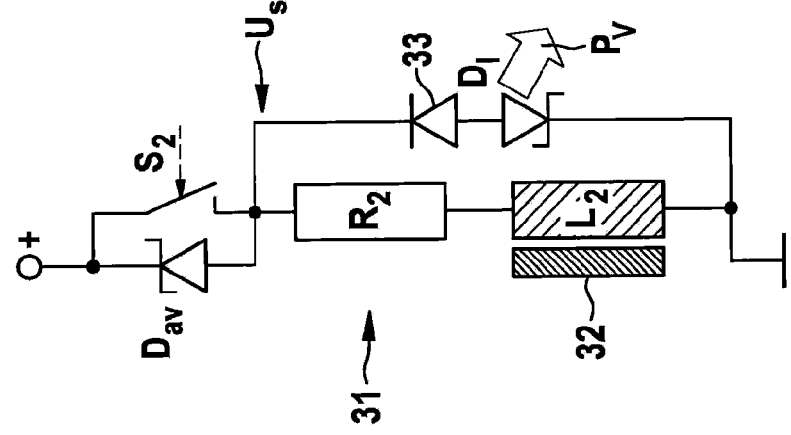
FIG. 3 shows a schematic view of a third example of a conventional electrical component.
Figure 2:
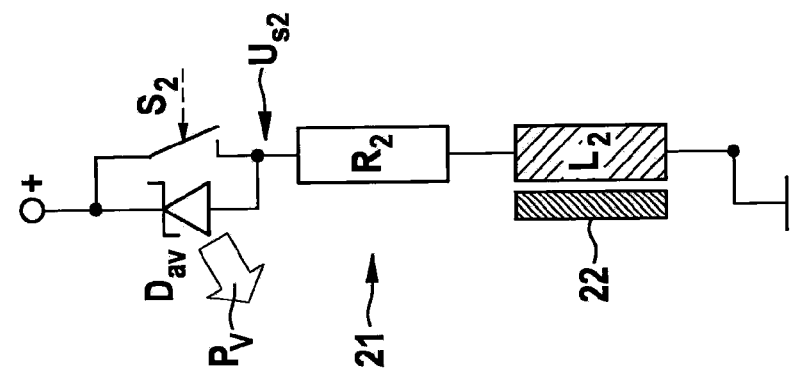
FIG. 2 shows a schematic view of a second example of a conventional electrical component.
Figure 1:
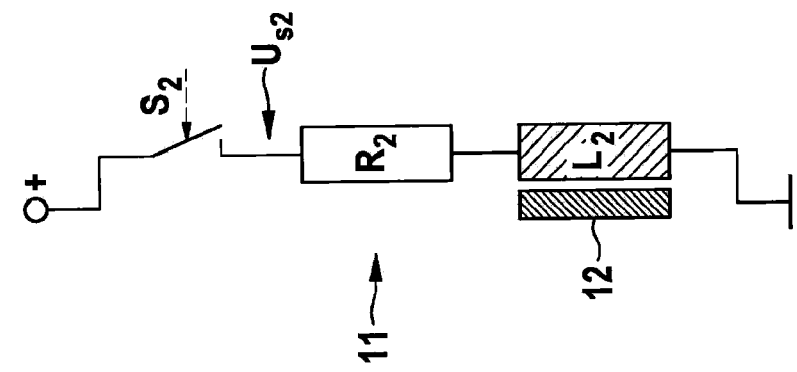
FIG. 1 shows a schematic view of a first example of a conventional electrical component.

A schematic view of a first exemplary embodiment of the electrical component 51 according to the present invention is illustrated in FIG. 5. Electrical component 51 has a core 52, a first coil $L_1$, $R_1$ positioned around core 52, and a second coil $L_2$, $R_2$ positioned around the core. Second coil $L_2$, $R_2$ may be switched on and off with the aid of a switch $S_2$. Supply voltage $U_v$ is applied to electrical component 51. When second coil $L_2$, $R_2$ is switched off, switch voltage $U_{S2}$ decreases at switch $S_2$.

In addition, electrical component 51 has a quenching circuit 53 made up of inductor $L_1$ of the first coil, resistor $R_1$ of the first coil, and a closing resistor $R_K$. Consequently, when second coil $L_2$, $R_2$ is switched off with the aid of switch $S_2$, first coil $L_1$, $R_2$ is short-circuited via quenching circuit 53 to quench the inductive load of second coil $L_2$, $R_2$.

Electrical component 61, which is illustrated in FIG. 6 and has core 62, first coil $L_1$, $R_1$ and second coil $L_2$, $R_2$, differs from the exemplary embodiment of FIG. 5 in the form of the quenching circuit and in the provision of a further switch $S_1$. Quenching circuit 63 of FIG. 6 is configured as a parallel circuit of first coil $L_1$, $R_1$ and the closing resistor $R_K$ between the further switch $S_1$ for connecting first coil $L_1$, $R_1$, and ground. Consequently, first coil $L_1$, $R_1$ may also be used not only as a quenching coil for second coil $L_2$, $R_2$, but also as an independent operating coil.

In addition, FIG. 7 shows electrical component 71, in which further operating coil $L_1$, $R_1$ functions as a quenching coil via parallel resistor $R_K$. In this context, quenching circuit 73 of electrical component 71 of FIG. 7 is made up of $R_1$, $L_1$ and $R_K$.

The exemplary embodiment of FIG. 8 differs from that of FIG. 7 in that in comparison with electrical component 71, additional inductors $L_{1p}$ and $L_{2p}$ are drawn into electrical component 81. These additional inductors $L_{1p}$ and $L_{2p}$ reflect the inductances occurring in reality, due to leakage fluxes and the existing lines.

FIG. 9 shows a schematic circuit diagram equivalent to the electrical component 51 of the present invention of FIG. 5. In this context, electrical component 91 of FIG. 9 corresponds to electrical component 51 of FIG. 5, a Zener diode $D_{av}$ being depicted as an illustration of the breakdown voltage occurring at switch $S_2$. The disruptive discharge power is denoted by $P_V$.

Furthermore, FIG. 10 shows a schematic circuit diagram for component 101 that is equivalent to the electrical component of the present invention according to FIG. 6. Zener diodes $D_{av}$ and $D_{loesch}$ are drawn in in correspondence with FIG. 9.

In addition, component 101 of FIG. 10 has a free-wheeling diode 104. Furthermore, FIG. 10 shows an equivalent circuit diagram having a parallel quenching circuit 103 for first coil $L_1$, $R_1$ and $L_2$, $R_2$.

For comparison to this, FIGS. 11 and 12 shows schematic, equivalent circuit diagrams for conventional electrical components 111 and 112, in which during the switching operation, a breakdown voltage $P_V$ occurs, in each instance, at the respective Zener diode $D_{av}$.

FIGS. 13-16 show schematic circuit diagrams equivalent to FIGS. 9-12, the schematic circuit diagrams having inductors $L_{1p}$ and $L_{2p}$ additionally drawn in, the inductors reflecting, in particular, the line inductances actually present. In this context, FIGS. 13-16 show the option of shifting the above-described quenching condition due to the parasitically occurring inductances $L_{1p}$, $L_{2p}$.

Figure 17:
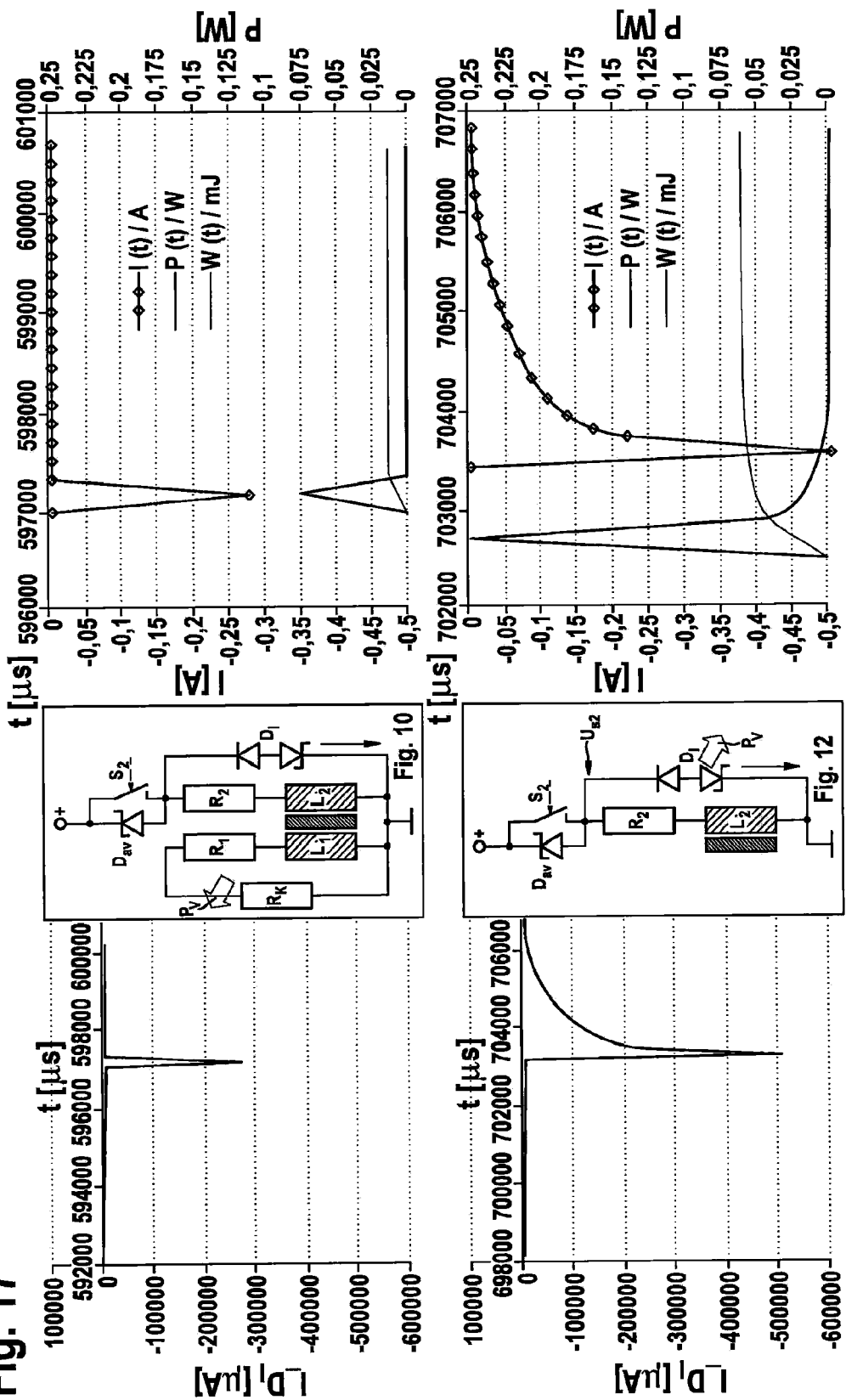
FIG. 17 shows a measurement example for comparing the equivalent circuit diagrams of the component of FIG. 10 according to the present invention, to the conventional component of FIG. 12.

FIG. 17 illustrates a measurement example for comparing the equivalent circuit diagrams of the component of FIG. 10 according to the present invention to the conventional component of FIG. 12. In detail, FIG. 17 shows a measurement example of a starter relay having separately controlled coils of a double coil. Current, voltage and power loss in the free-wheeling circuit with and without a quenching coil are plotted at the top (region of FIG. 10) and at the bottom (region of FIG. 12). The quenching power of free-wheeling diode 104 and 124 (see FIGS. 10 and 12) is only low with a quenching coil. Consequently, the efficiency of quenching coil $R_2$, $L_2$ is shown. Without free-wheeling, breakdown voltage $V_{av}$ would be higher, and it could be completely quenched via quenching coil $L_1$, $R_2$.

For FIG. 17, the values are selected as follows: $U_v$=1.5 V, $R_1$=1.4Ω, $n_1$=110, $R_2$=2.8Ω, $n_2$=150, $R_K$=0, $U_d$=0.7 V.

Figure 18:
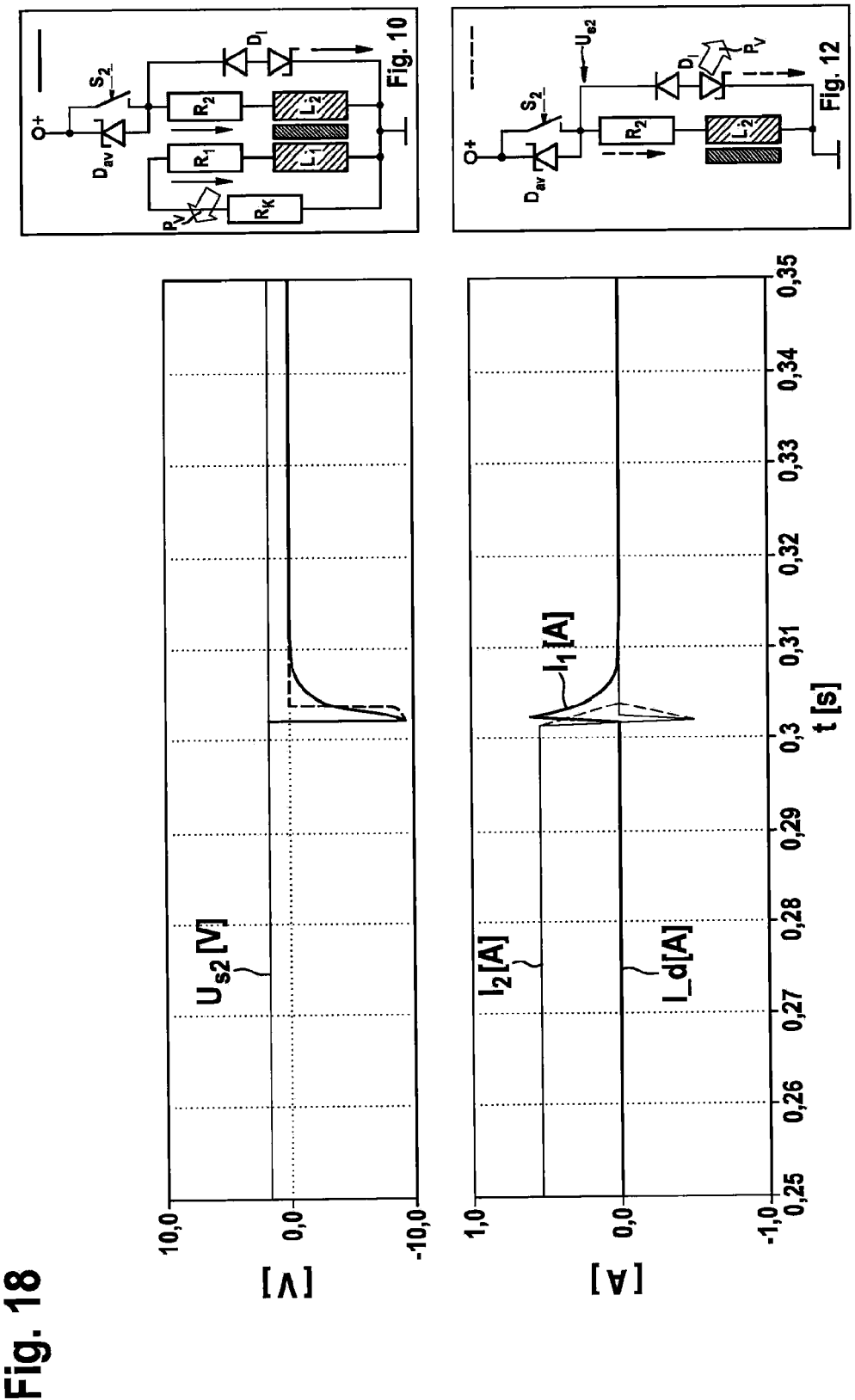
FIG. 18 shows an example of a simulation corresponding to FIG. 17.

A corresponding simulation example having an additional Zener diode is illustrated in FIG. 18. In this manner, the closing resistance or short-circuit resistance $R_K$ may still be increased.

Figure 19:
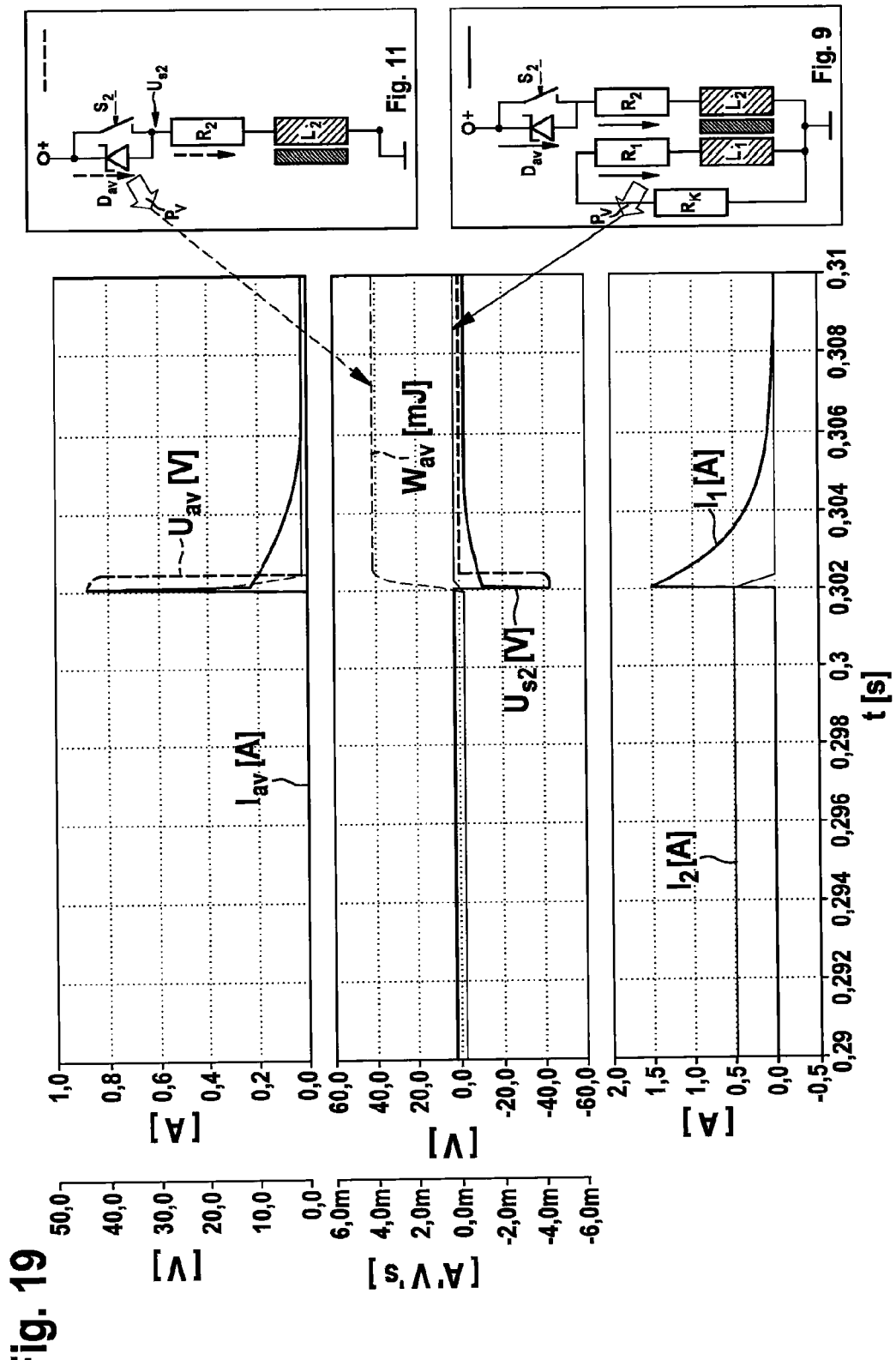
FIG. 19 shows a simulation example of the disruptive discharge power for comparing the equivalent circuit diagrams of the component of FIG. 10 according to the present invention, to that of the conventional component of FIG. 12.

In addition, FIG. 19 shows a simulation example for the disruptive discharge power with the quenching coil according to FIG. 10, and without the quenching coil according to FIG. 12. The dashed line illustrated with reference to FIG. 12 shows that an arc voltage or an avalanche voltage occurs without a quenching circuit. In addition, FIG. 19 shows that the higher the breakdown voltage $V_{av}$, the greater the effect of the quenching circuit, since due to the higher breakdown voltage $V_{av}$, the quenching coil in FIG. 10, with reference to FIG. 19, functions highly effectively without a free-wheeling circuit. Only parasitic inductances having a low level of energy have to be quenched at switch $S_2$.

For FIG. 19, the values are selected as follows: $U_v$=1.5 V, $R_1$=1.4Ω, $n_1$=110, $R_2$=2.8Ω, $n_2$=150, $R_K$=1Ω, $U_{av}$=50 V.

Figure 20:
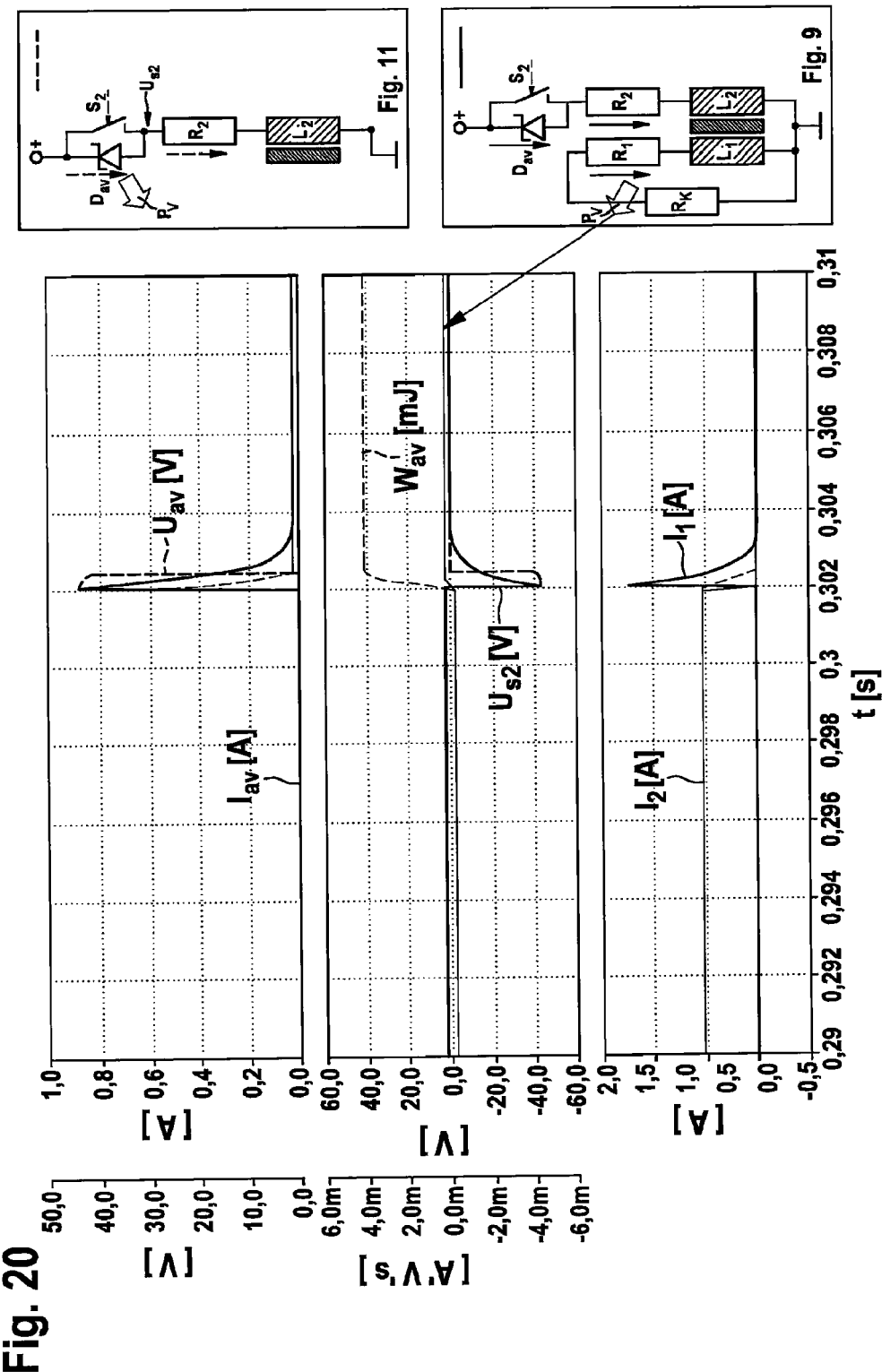
FIG. 20 shows a simulation example of the disruptive discharge power at the limit of the quenching condition for comparing the equivalent circuit diagrams of the component of FIG. 10 according to the present invention, to that of the conventional component of FIG. 12.

FIG. 20 shows a simulation example for the breakdown voltage at the limit of the quenching condition. In this context FIG. 20 shows that the decay time constant $\tau = L_1/(R_{k+1})$ may be reduced by the higher breakdown voltage. In this context, the limiting case for the quenching mainly by the quenching coil is illustrated here.

For FIG. 20, the values are selected as follows: $U_v$=1.5 V, $R_1$=1.4Ω, $n_1$=110, $R_2$=2.8Ω, $n_2$=150, $R_K$=10Ω, $U_{av}$=50 V.

In addition, FIG. 21 shows a simulation example for the disruptive discharge power in the case of a greater supply voltage $V_v$. In this context, FIG. 21 shows, in particular, that decay time constant $\tau$ must be increased with increasing supply voltage $V_v$. Then, quenching is provided completely by the quenching coil.

For FIG. 21, the values are selected as follows: $U_v=12.5$ V, $R_1=1.4\Omega$, $n_1=110$, $R_2=2.8\Omega$, $n_2=150$, $R_K=1\Omega$, $U_{av}=50$ V.

Furthermore, FIG. 22 shows a simulation example for the quenching limit at a greater supply voltage. In this limiting case, quenching is carried out chiefly by the quenching coil.

For FIG. 22, the values are selected as follows: $U_v=12.5$ V, $R_1=1.4\Omega$, $n_1=110$, $R_2=2.8\Omega$, $n_2=150$, $R_K=5\Omega$, $U_{av}=50$ V. This yields an arithmetic value of $R_K<4.76\Omega$.

Figure 23:
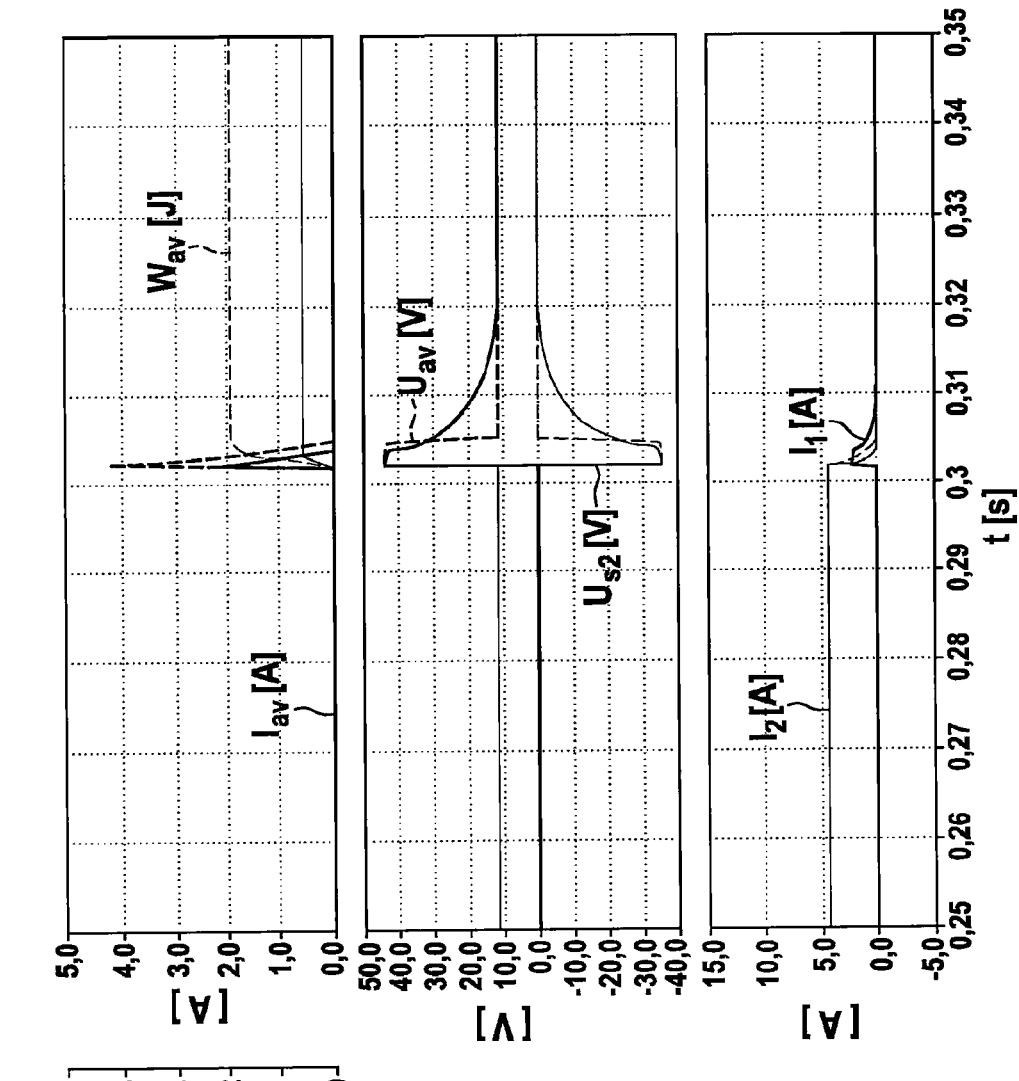
FIG. 23 shows a simulation example of the exceeded quenching limit for comparing the equivalent circuit diagrams of the component of FIG. 10 according to the present invention, to that of the conventional component of FIG. 12.

FIG. 23 shows a simulation example of the exceeded quenching limit. In this context, FIG. 23 shows, in detail, that when closing resistance $R_K$ is further increased in the quenching circuit without further decreasing the decay time constant, the quenching effect is reduced. In other words, in the case of a closing resistance $R_K$ that is too large, time constant $\tau$ may be selected to be too small, which means that a disruptive discharge may occur at switch $S_2$.

For FIG. 23, the values are selected as follows: $U_v=12.5$ V, $R_1=1.4\Omega$, $n_1=110$, $R_2=2.8\Omega$, $n_2=150$, $R_K=10\Omega$, $U_{av}=50$ V.

Figure 24:
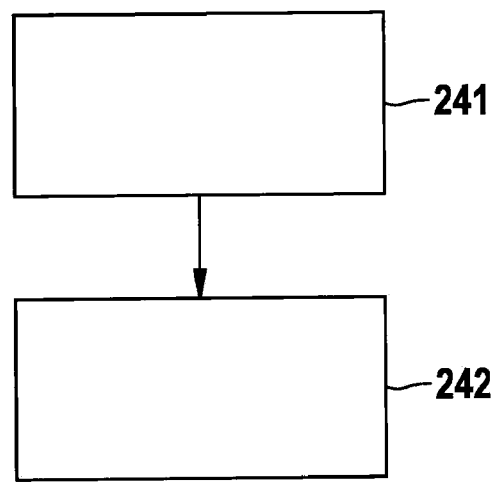
FIG. 24 shows a schematic flow chart of an exemplary embodiment of the method of the present invention for controlling an electrical component.

FIG. 24 shows a schematic flow chart of an exemplary embodiment of the example method of the present invention for controlling an electrical component 51. The exemplary embodiment of FIG. 24 has the method steps 241 and 242 and is explained with reference to FIG. 5:

Method Step 241:

An electrical component 51 is provided, which has a core 52, a first coil $L_1$, $R_1$, a second coil $L_2$, $R_2$ and a switch $S_2$ for switching second coil $L_2$, $R_2$ on and off.

Method Step 242:

When second coil $L_2$, $R_2$ is switched off, first coil $L_1$, $R_1$ is short-circuited via a quenching circuit 53 to quench the inductive load of second coil $L_2$, $R_2$.

What is claimed is:

1. An electrical component, comprising:
   a core;
   a first coil positioned around the core;
   a switch; and
   a second coil positioned around the core and switchable with the aid of the switch, wherein when the second coil is switched off, the first coil is short-circuited via a quenching circuit to quench an inductive load of the second coil, wherein the quenching circuit is configured as a shorted circuit made up of a loop circuit of a closing resistor and the first coil having a coil resistance, the loop circuit being connected to ground.

2. The component as recited in claim 1, wherein the second coil is configured as an operating coil of the component, and the first coil is configured as a quenching coil for quenching the inductive load of the operating coil.

3. The component as recited in claim 1, wherein the quenching circuit is configured as a shorted circuit made up of a series circuit of the closing resistor and the first coil, the first coil having a particular number of windings, a particular inductance and a particular coil resistance.

4. The component as recited in claim 1, wherein the first coil is positioned on the core as a reactive coil formed separately from the second coil.

5. The component as recited in claim 1, wherein the quenching circuit is configured as a parallel circuit of the first coil and the closing resistor, wherein the closing resistor is located between ground and a further switch for switching the first coil.

6. The component as recited in claim 5, wherein the further switch is set up to switch on the first coil in response to the second coil being switched off with the aid of the switch.

7. The component as recited in claim 5, wherein the first coil functions as an operating coil in response to being switched on with the aid of the further switch.

8. The component as recited in claim 1, wherein ratios of resistances to numbers of windings of the first and second coils are set as a function of a supply voltage applied to the component and of a breakdown voltage of the switch, so that the breakdown voltage is less than a differential voltage between the supply voltage and a switch voltage decreasing during the switching operation at the switch.

9. The component as recited in claim 8, wherein the ratio satisfies the condition:

$$(R_K+R_1)*n_2/n_1>(U_{av}-U_v)/I_2,$$

where $R_1$ designates the resistance of the first coil, $n_1$ is the number of windings of the first coil, $n_2$ is the number of windings of the second coil, $R_K$ is a closing resistance of the quenching circuit, $U_v$ designates the supply voltage, $U_{av}$ is the breakdown voltage of the switch and $I_2$ is current flowing through a resistor of the second coil.

10. The component as recited in claim 9, wherein the component is one of an electromagnetic switching and engaging relay, or a transformer.

11. The component as recited in claim 1, wherein the switch is a field effect transistor.

12. A starter for a motor vehicle, comprising:
   an electrical component including a core, a first coil positioned around the core, a switch, and a second coil positioned around the core and is switchable with the aid of the switch, wherein when the second coil is switched off, the first coil is short-circuited via a quenching circuit to quench an inductive load of the second coil, wherein the quenching circuit is configured as a shorted circuit made up of a loop circuit of the first coil and a closing resistor, the loop circuit being connected to ground.

13. A method for controlling an electrical component having a core, a first coil positioned around the core, a second coil positioned around the core, and a switch for switching the second coil, the method comprising:
   short-circuiting the first coil via a quenching circuit to quench an inductive load of the second coil when the second coil is switched off, wherein the quenching circuit is configured as a shorted circuit made up of a loop circuit of the first coil and a closing resistor, the loop circuit being connected to ground.

* * * * *